US012659013B2

(12) United States Patent
Berg et al.

(10) Patent No.: US 12,659,013 B2
(45) Date of Patent: *Jun. 16, 2026

(54) EVALUATING A TIME-DOMAIN SIGNAL

(71) Applicant: Telefonaktiebolaget LM Ericsson (publ), Stockholm (SE)

(72) Inventors: Miguel Berg, Sollentuna (SE); Chenguang Lu, Sollentuna (SE); Per Ola Börjesson, Mörrum (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

This patent is subject to a terminal disclaimer.

(21) Appl. No.: 18/690,883

(22) PCT Filed: Sep. 9, 2022

(86) PCT No.: PCT/EP2022/075136

§ 371 (c)(1),
(2) Date: Mar. 11, 2024

(87) PCT Pub. No.: WO2023/041440

PCT Pub. Date: Mar. 23, 2023

(65) Prior Publication Data

US 2025/0141531 A1     May 1, 2025

(30) Foreign Application Priority Data

Sep. 17, 2021    (WO) ................ PCT/SE2021/050897

(51) Int. Cl.
H04L 5/00          (2006.01)
H04B 7/08          (2006.01)
H04W 72/044      (2023.01)

(52) U.S. Cl.
CPC ......... H04L 5/0005 (2013.01); H04B 7/0854 (2013.01); H04W 72/044 (2013.01)

(58) Field of Classification Search
CPC .... H04B 7/084; H04B 7/0854; H04B 7/0857; H04L 5/0005; H04L 5/0051; G01S 5/0221; G01S 5/06; H04W 72/044
See application file for complete search history.

(56) References Cited

U.S. PATENT DOCUMENTS 4,876,549 A     10/1989  Masheff
7,421,015 B2 *  9/2008  Sedarat ................. H04L 5/0044
                                                            375/222

(Continued)

FOREIGN PATENT DOCUMENTS

JP        2017216499 A     12/2017
KR      20170126305 A     11/2017
WO      2023043348 A1      3/2023

OTHER PUBLICATIONS

International Search Report and Written Opinion for International Patent Application No. PCT/EP2022/075136, mailed Nov. 22, 2022, 10 pages.

(Continued)

*Primary Examiner* — Dac V Ha

(74) *Attorney, Agent, or Firm* — Withrow & Terranova, PLLC

(57)          ABSTRACT

A method is provided for evaluating a first time-domain signal received from a single source, wherein the time domain signal is processed with a Fourier-related transform with overlapping input frames to provide a first frequency-domain signal being made up of frames of coefficients, wherein only one part is included in the first frequency-domain signal, wherein a first part is the part, real or imaginary, that is included in the frequency-domain signal and a second part is the part, real or imaginary, that is not included in the frequency-domain signal. The method is performed by a signal evaluator. The method comprises: receiving the first frequency-domain signal; obtaining a (Continued)

reference frequency-domain signal; and determining a first cross-correlation between the received first frequency-domain signal and the reference frequency-domain signal by cross-correlating the received first frequency-domain signal and the reference frequency-domain signal.

26 Claims, 7 Drawing Sheets

(56) References Cited

U.S. PATENT DOCUMENTS

| | | | |
|---|---|---|---|
| 7,623,578 B2* | 11/2009 | Pisoni | H04L 27/2647 |
| | | | 375/232 |
| 8,031,119 B1 | 10/2011 | Francis et al. | |
| 9,967,807 B2 | 5/2018 | Pu et al. | |
| 10,175,335 B1 | 1/2019 | Stefanakis et al. | |
| 2008/0069252 A1 | 3/2008 | Wenzhen et al. | |
| 2017/0090009 A1 | 3/2017 | Amishima et al. | |
| 2019/0052500 A1 | 2/2019 | Choi et al. | |
| 2020/0013420 A1 | 1/2020 | Wallace et al. | |
| 2020/0177417 A1 | 6/2020 | Tangudu et al. | |
| 2023/0180165 A1* | 6/2023 | Su | H04L 7/007 |
| | | | 370/503 |
| 2025/0141531 A1 | 5/2025 | Berg et al. | |

OTHER PUBLICATIONS

International Search Report and Written Opinion for International Patent Application No. PCT/SE2021/050897, mailed Jun. 21, 2022, 10 pages.
Fraunhofer Iis, et al., "R1-1911207: Remaining Details on Uplink PRS Signal Design," 3GPP TSG RAN WG1 Meeting #98-Bis, Oct. 14-20, 2019, Chongqing, China, 14 pages.
Request for the Submission of an Opinion for Korean Patent Application No. 10-2024-7008085, mailed Dec. 22, 2025, 13 pages.
Examination Report for European Patent Application No. 21790582. 7, mailed Mar. 25, 2026, 4 pages.
Examination Report for European Patent Application No. 22782480. 2, mailed Mar. 31, 2026, 6 pages.

\* cited by examiner 32     33

31➤ 0   8   16   24   32   40   48   56   64   72   80   88   96   104  112  120

30

32     30

33

31➤  104                      112                    120

EVALUATING A TIME-DOMAIN SIGNAL

This application is a 35 U.S.C. § 371 national phase filing of International Application No. PCT/EP2022/075136, filed Sep. 9, 2022, which claims the benefit of International Application No. PCT/SE2021/050897, filed Sep. 17, 2021, the disclosures of which are incorporated herein by reference in their entireties.

TECHNICAL FIELD

The present disclosure relates to the field of evaluating signals. More specifically, the present disclosure relates to cross-correlation between at least one received signal and a reference signal.

BACKGROUND

In many situations, it is useful to evaluate a received wireless signal. For instance, time, phase and/or power differences between multiple signals received from a single source (via different antennas) can be used to determine a position, or to enable coherent combining (e.g. equal-gain or maximal ratio combining) of the multiple received signals.

Another evaluation is based on sending a known transmission signal and evaluating a received signal by comparing with the known transmission. This can be used e.g. to survey a surrounding to detect nearby objects.

One known method of determining a relation between signals is to perform a cross-correlation between signals. Such correlation can be calculated in the time domain using the definition of cross-correlation. Also, this calculation can be performed in the frequency domain, in a more computationally efficient manner.

However, when data compression is applied in a fronthaul link from a reception point to an aggregation point such that one part (real or imaginary) is included on the fronthaul link, there are no complex numbers of the received signal(s) for the cross-correlation, other than by transforming back to the time domain and performing cross-correlation based on the time-domain signal, or yet another transform to the frequency domain. Such a solution requires a lot of resources.

SUMMARY

One object is to evaluate signals in an efficient manner, where at least one signal is a received signal, and at least one of the signals contains only frequency-domain coefficients of one part (real or imaginary).

According to a first aspect, it is provided a method for evaluating a first time-domain signal received from a single source by one or more antennas, wherein the time domain signal is processed with a Fourier-related transform with overlapping input frames to indirectly or directly provide a first frequency-domain signal being made up of frames of frequency-domain coefficients, wherein only one part, of the real part and the imaginary part from the Fourier-related transform, is included in the first frequency-domain signal, wherein a first part is the part, real or imaginary, that is included in the frequency-domain signal and a second part is the part, real or imaginary, that is not included in the frequency-domain signal. The method is performed by a signal evaluator. The method comprises: receiving the first frequency-domain signal; obtaining a reference frequency-domain signal; and determining a first cross-correlation between the received first frequency-domain signal and the reference frequency-domain signal by cross-correlating the received first frequency-domain signal and the reference frequency-domain signal.

The method may further comprise: receiving a second frequency-domain signal being made up of frames of frequency-domain coefficients, wherein only the first part from the Fourier-related transform is included in the second frequency-domain signal; determining a second cross-correlation between the received second frequency-domain signal and the reference frequency-domain signal by cross-correlating the received second frequency-domain signal and the reference frequency-domain signal; and determining a relation between the first frequency-domain signal and the second frequency-domain signal based on the results of the first cross-correlation and the second cross-correlation.

The obtaining a reference frequency-domain signal may comprise obtaining a time-domain reference signal and converting the time-domain reference signal to the frequency-domain reference signal.

The time-domain reference signal may be a sounding reference signal, SRS.

The time-domain reference signal may be a demodulation reference signal, DMRS.

The reference frequency-domain signal may be based on a signal that was transmitted by an antenna associated with the signal evaluator.

The reference frequency domain signal may be a regular downlink signal, or a signal specially configured for sensing purposes.

The reference frequency-domain signal may comprise complex value coefficients, and the cross-correlation(s) are half-complex cross-correlation(s).

The reference frequency-domain signal may only include coefficient values being of the first part, in which case the determining a first cross-correlation and determining a second cross-correlation each comprises: determining a first part cross-correlation between the respective received, first or second, frequency-domain signal and the reference frequency-domain signal by cross-correlating corresponding frames in the respective received frequency-domain signal and the reference frequency-domain signal, for the first part; and determining a second part cross-correlation between the respective received frequency-domain signal and the reference frequency-domain signal by cross-correlating non-corresponding frames in the respective received frequency-domain signal and the reference frequency-domain signal, for the second part.

In the determining a second part cross-correlation, the cross-correlation may be performed for frames where the frame in the first frequency-domain signal is one frame ahead of the frame in the second frequency-domain signal, and/or vice versa.

The determining a relation between the first frequency-domain signal and the second frequency-domain signal may comprise determining a time difference, phase difference, or power ratio, between the first frequency-domain signal and the second frequency-domain signal.

The method may further comprise: determining a position of the single source based on at least one of the time difference, phase difference and power ratio.

The method may further comprise: performing signal combining based on at least one of the time difference, the phase difference and the power ratio.

The method may further comprise: determining a time difference, phase difference, power ratio, or channel impulse response between the reference frequency-domain signal and the first frequency-domain signal based on the first cross-correlation.

The method may further comprise: determining presence of an object based on the channel impulse response.

The method may further comprise: selecting bins and frames to use for the cross-correlation(s) based on bins and frames assigned for a particular user.

The method may further comprise: normalising cross-correlation(s) on a bin-by-bin basis.

The method may further comprise: scaling the cross-correlation(s) to enable time-domain alias cancellation.

The obtaining a reference frequency-domain signal may comprise generating frequency-domain coefficients for a subset of transforms associated with an OFDM symbol, by phase rotation of frequency-domain coefficients for a different subset of transforms associated with the OFDM symbol, wherein the phase rotation is based on one or more of comb offset and frequency shift of the carrier.

According to a second aspect, it is provided a signal evaluator for evaluating a first time-domain signal received from a single source by one or more antennas, wherein the time domain signal is processed with a Fourier-related transform with overlapping input frames to indirectly or directly provide a first frequency-domain signal being made up of frames of frequency-domain coefficients, wherein only one part, of the real part and the imaginary part from the Fourier-related transform, is included in the first frequency-domain signal, wherein a first part is the part, real or imaginary, that is included in the frequency-domain signal and a second part is the part, real or imaginary, that is not included in the frequency-domain signal. The signal evaluator comprises: a processor; and a memory storing instructions that, when executed by the processor, cause the signal evaluator to: receive the first frequency-domain signal; obtain a reference frequency-domain signal; and determine a first cross-correlation between the received first frequency-domain signal and the reference frequency-domain signal by cross-correlating the received first frequency-domain signal and the reference frequency-domain signal.

The signal evaluator may further comprise instructions that, when executed by the processor, cause the signal evaluator to: receive a second frequency-domain signal being made up of frames of frequency-domain coefficients, wherein only the first part from the Fourier-related transform is included in the second frequency-domain signal; determine a second cross-correlation between the received second frequency-domain signal and the reference frequency-domain signal by cross-correlating the received second frequency-domain signal and the reference frequency-domain signal; and determine a relation between the first frequency-domain signal and the second frequency-domain signal based on the results of the first cross-correlation and the second cross-correlation.

The instructions to obtain a reference frequency-domain signal may comprise instructions that, when executed by the processor, cause the signal evaluator to obtain a time-domain reference signal and converting the time-domain reference signal to the frequency-domain reference signal.

The time-domain reference signal may be a sounding reference signal, SRS.

The time-domain reference signal may be a demodulation reference signal, DMRS.

The reference frequency-domain signal may be based on a signal that was transmitted by an antenna associated with the signal evaluator.

The reference frequency domain signal may be a regular downlink signal, or a signal specially configured for sensing purposes.

The reference frequency-domain signal may comprise complex value coefficients, and the cross-correlation(s) are half-complex cross-correlation(s).

The reference frequency-domain signal may only include coefficient values being of the first part, in which case the instructions to determine a first cross-correlation and the instructions to determine a second cross-correlation each comprise instructions that, when executed by the processor, cause the signal evaluator to: determine a first part cross-correlation between the respective received, first or second, frequency-domain signal and the reference frequency-domain signal by cross-correlating corresponding frames in the respective received frequency-domain signal and the reference frequency-domain signal, for the first part; and determine a second part cross-correlation between the respective received frequency-domain signal and the reference frequency-domain signal by cross-correlating non-corresponding frames in the respective received frequency-domain signal and the reference frequency-domain signal, for the second part.

The instructions to determine a second part cross-correlation may comprise instructions that, when executed by the processor, cause the signal evaluator to perform the cross-correlation for frames where the frame in the first frequency-domain signal is one frame ahead of the frame in the second frequency-domain signal, and/or vice versa.

The instructions to determine a relation between the first frequency-domain signal and the second frequency-domain signal may comprise instructions that, when executed by the processor, cause the signal evaluator to determine a time difference, phase difference, or power ratio, between the first frequency-domain signal and the second frequency-domain signal.

The signal evaluator may further comprise instructions that, when executed by the processor, cause the signal evaluator to: determine a position of the single source based on at least one of the time difference, phase difference and power ratio.

The signal evaluator may further comprise instructions that, when executed by the processor, cause the signal evaluator to: perform signal combining based on at least one of the time difference, the phase difference and the power ratio.

The signal evaluator may further comprise instructions that, when executed by the processor, cause the signal evaluator to: determine a time difference, phase difference, power ratio, or channel impulse response between the reference frequency-domain signal and the first frequency-domain signal based on the first cross-correlation.

The signal evaluator may further comprise instructions that, when executed by the processor, cause the signal evaluator to: determine presence of an object based on the channel impulse response.

The signal evaluator may further comprise instructions that, when executed by the processor, cause the signal evaluator to: select bins and frames to use for the cross-correlation(s) based on bins and frames assigned for a particular user.

The signal evaluator may further comprise instructions that, when executed by the processor, cause the signal evaluator to: normalise cross-correlation(s) on a bin-by-bin basis.

The signal evaluator may further comprise instructions that, when executed by the processor, cause the signal evaluator to: scale the cross-correlation(s) to enable time-domain alias cancellation.

The instructions to obtain a reference frequency-domain signal may comprise instructions that, when executed by the processor, cause the signal evaluator to: generate frequency-domain coefficients for a subset of transforms associated with an OFDM symbol, by phase rotation of frequency-domain coefficients for a different subset of transforms associated with the OFDM symbol, wherein the phase rotation is based on one or more of comb offset and frequency shift of the carrier.

According to a third aspect, it is provided a computer program for evaluating a first time-domain signal received from a single source by one or more antennas, wherein the time domain signal is processed with a Fourier-related transform with overlapping input frames to indirectly or directly provide a first frequency-domain signal being made up of frames of frequency-domain coefficients, wherein only one part, of the real part and the imaginary part from the Fourier-related transform, is included in the first frequency-domain signal, wherein a first part is the part, real or imaginary, that is included in the frequency-domain signal and a second part is the part, real or imaginary, that is not included in the frequency-domain signal. The computer program comprises computer program code which, when executed on a signal evaluator causes the signal evaluator to: receive the first frequency-domain signal; obtain a reference frequency-domain signal; and determine a first cross-correlation between the received first frequency-domain signal and the reference frequency-domain signal by cross-correlating the received first frequency-domain signal and the reference frequency-domain signal.

According to a fourth aspect, it is provided a computer program product comprising a computer program according to third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1A:
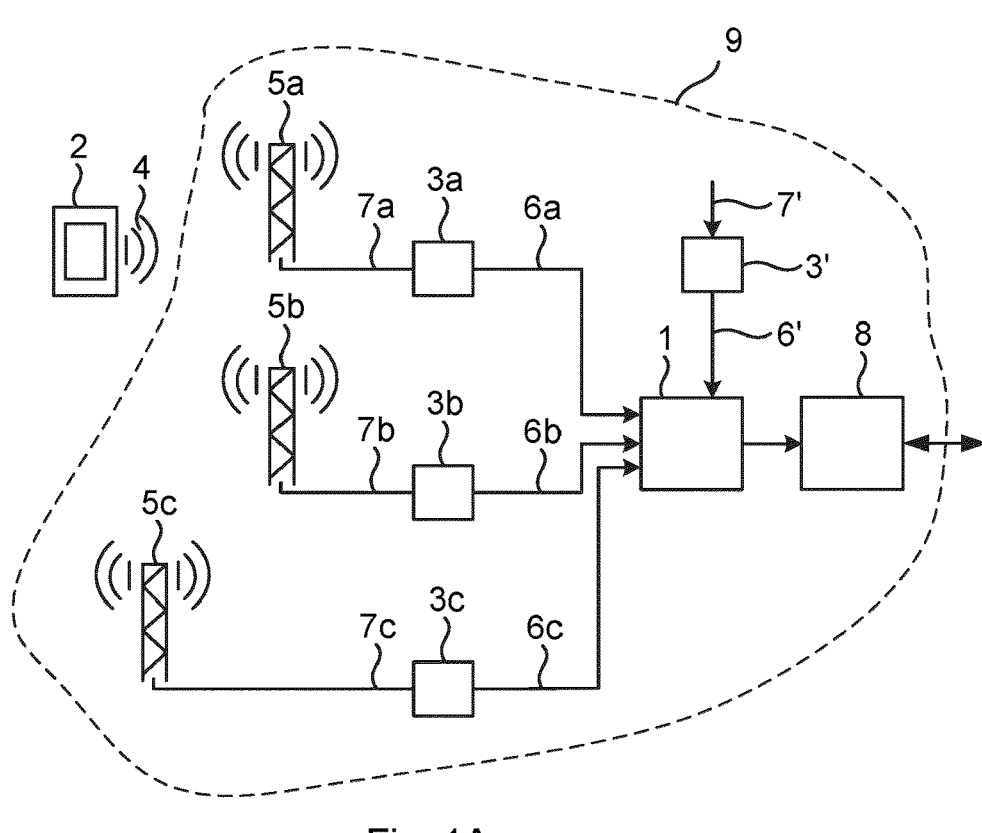
FIGS. 1A-B are schematic diagrams illustrating environments in which embodiments presented herein can be applied.
Figure 1B:
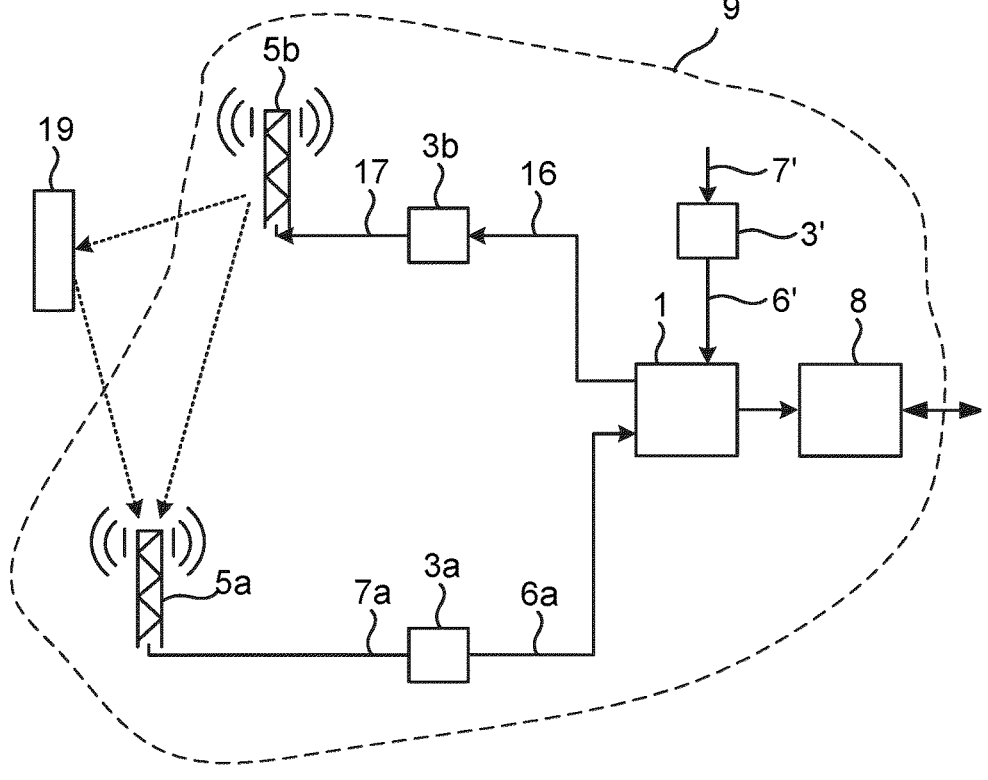

FIGS. 1A-B are schematic diagrams illustrating environments in which embodiments presented herein can be applied. First, the environment of FIG. 1A will be described.

A single source 2 transmits a wireless signal 4 that is received by a plurality of antennas 5a-c. The single source 2 does not need to be the only source of signals, but from the perspective of receiving a wireless signal, the single source 2 is the only source of a particular wireless signal 4 that is received by the plurality of antennas 5a-c. The single source can be implemented as an instance of user equipment (UE), and can be, for example, what today are commonly known as a mobile phone, smart phone or a tablet/laptop with wireless connectivity.

The wireless transmission can occur over a cellular communication network that can comply with any one or a combination of 6G, 5G NR (New Radio), LTE (Long Term Evolution), LTE Advanced, W-CDMA (Wideband Code Division Multiplex), or any other current or future wireless network, as long as the principles described hereinafter are applicable.

While FIG. 1A is illustrated with three antennas 5a-c, the embodiments presented herein can be applied with any number of antennas. The antennas 5a-c are provided physically separated, such that some value can be gained by finding a difference or relation between signals received between different antennas. The antennas can be physically separated, but provided on the same device, be different and/or the antennas can be provided in different locations. In one embodiment, the antennas are all associated with the same cell identifier. Each one of the antennas 5a-c is connected to a respective converter device 3a-c. Each combination of antenna and converter device 3a-c can be part of a separate remote radio head (RRH) associated with a single baseband unit 8. All converter devices 3a-c and antennas 5a-c connected to the single baseband unit 8 combines is denoted a base station device 9 and share the same cell identifier. It is to be noted that the converter devices 3a-c and the antennas 5*a-c* can be located at some distance from the signal evaluator 1 and the baseband device 8 to provide improved coverage.

The antennas 5*a-c* receive the wireless signals and provide these as respective time-domain signals 7*a-c*, consisting of complex-value samples, to each one of the converter devices 3*a-c*. As described in more detail below, each one or the converter devices 3*a-c* performs a Fourier-related transform to transform the time-domain signals 7*a-c* to respective frequency-domain signal 6*a-c*.

The frequency-domain signals 6*a-c* contain values of only one part (real or imaginary), despite the input to the transform being complex. The reason for this is to reduce resource requirements for communicating the frequency-domain signals 6*a-c* on a front haul link for subsequent aggregation. Details of this process is provided below. The frequency-domain signals 6*a-c* are provided to a signal evaluator 1 on the fronthaul link.

Another input to the signal evaluator is a reference signal. A reference time-domain signals 7', consisting of complex-value values, is provided to a converter device 3', that performs actions equivalent to those performed by the converter devices 3*a-c*. Hence, the converter device 3' performs a Fourier-related transform to transform the reference time-domain signals 7' to a reference frequency-domain signal 6'.

As explained in more detail below, the signal evaluator 1 determines a relation between at least two frequency-domain signals, e.g. phase difference, time difference, power ratio, channel impulse response, etc, by cross-correlating the received signals against the reference signal. This relation can be used for positioning the single source 2, signal combining or for detecting physical objects in the vicinity.

The signal evaluator 1 can also be used to aggregate the frequency-domain signals and optionally also to reconstitute a time-domain signal based on the received frequency-domain signals 6*a-c*. Alternatively, aggregation and decoding can be performed by devices after the signal evaluator 1, such as the baseband unit 8.

Looking now to FIG. 1B, a transmission path is also shown. A frequency-domain transmission signal 16 is converted by the second converter 3*b* to a time-domain transmission signal 17 for transmission over the first antenna 5*a*.

The first antenna 5*a* picks up the received signal and forwards the signal as a time-domain signal 7*a*, which is converted to a frequency-domain signal 6*a* by the first converter 3*a*. Hence, in the embodiment of FIG. 1B, there is only a single received signal.

The signal evaluator 1 performs, as described in more detail below, a cross-correlation between the transmitted signal and the received signal, in the frequency domain, e.g. to determine a channel impulse response between the second antenna 5*b* and the first antenna 5*a*. This can be used to e.g. detect an object 19 that reflects the signal transmitted by the second antenna 5*b*. Furthermore, the channel impulse response can be used to for time-alignment between the antennas 5*a*, 5*b* based on determining a time synchronization error. It is to be noted that, when in full-duplex mode, the antenna that transmits the transmission signal can also be used for receiving the transmitted signal.

Figure 2:
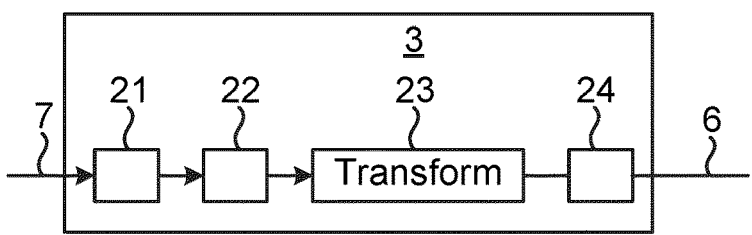
FIG. 2 is a schematic diagram illustrating encoding of data according to some embodiments by a converter device of FIGS. 1A-B.

FIG. 2 is a schematic diagram illustrating encoding of data according to some embodiments by any one of the converter devices 3*a-c*, 3' of FIGS. 1A-B. There is a single converter device 3 in FIG. 2, representing the actions of each one of a plurality of converter devices 3*a-c*, 3' of FIGS. 1A-B.

The input is a time-domain signal 7, in the form of IQ (in-phase quadrature) samples for a single carrier, or for multiple frequency-, code- and/or time-multiplexed carriers. An input framer 21 arranges the time-domain signal in overlapping frames, for instance 50% overlap (in time). A time-domain window function a(n) is applied by a time-domain window module 22. A transform module 23 applies a Fourier-related transform to transform the signal to the frequency domain, also denoted the transform domain herein. The Fourier-related transform is a transform function related to Fourier analysis and can e.g. be in the form of a Discrete Fourier Transform (DFT), Short-time Fourier transform (STFT), Generalized Discrete Fourier Transform (GDFT), Modified Discrete Cosine Transform (MDCT) and Modified Discrete Sine Transform (MDST), or any other suitable transform, resulting in, for each frame, a number of coefficients provided in respective frequency bins. Whenever the term 'bin' is used herein, it refers to such frequency bins after the Fourier-related transform. A frequency-domain window function $W^*(k)$ where k is the frequency bin index, is applied by a frequency-domain window module 24, resulting in a frequency-domain signal 6. The operator * denotes complex conjugate. Optionally, the transform applied in the transform module is configured to include $W^*(k)$ as part of the transform, in which case the separate frequency-domain window module is not needed. In this case, the transform is in the form of a GDFT. The examples described hereinafter are based on the transform module applying a DFT. Other transforms can be applied, but would result in different window functions $W^*(k)$ and a(n), Embodiments presented herein are based on only one part (real or imaginary) of the coefficients forming part of the frequency-domain signal 6. In the following, for making the description clearer, it is mainly referred to imaginary part being excluded, but it is to be noted that the same procedure can be applied for the real part being excluded.

The imaginary part of the transform can be discarded as part of the transform, as part of the multiplication with the frequency-domain window $W^*(k)$ or as a separate step. Discarding of the imaginary part is done to achieve data compression, compensating for the overlap in the input framing. For practical use of transform coding, a quantization step is also used for bitrate reduction, but this is omitted herein to improve clarity. Errors due to quantization can be modelled as noise. Another step that can be performed to improve data compression is to omit coefficients with a lower magnitude than a threshold value.

Time difference, phase difference, power ratio, or channel impulse response between signals can be estimated using cross-correlation. In the time-domain, this involves convolution operations, which implies high computational complexity. Further, for transform coded signals as in embodiments presented herein, each received signal would have to be decoded before such a convolution. For signals that are to be combined, this means additional complexity increase since it is no longer sufficient to have a single decoder for the combined signal. Also, information from the correlation can be exploited to improve the combining (e.g. for co-phasing based on time-difference and/or phase-difference estimates, and/or for scaling based on power ratio to achieve Maximal-Ratio Combining).

According to embodiments presented herein, each frequency-domain received signal is correlated with a reference frequency-domain signal.

Mathematical Model

The process correlation of frequency-domain signals according to embodiments presented herein will now be described with more mathematical rigour.

Basic Derivations of Correlations in the Transform Domain

Our time delay estimates in the transform domain are derived starting with corresponding time-domain signals at the reception points RP1 and RP2, before the Fourier-related transform in FIG. 2, assuming line-of-sight propagation (multipath could be handled at least to some extent by superposition)

$$z_{1,m+d}(n_1) = a(n_1) \cdot A_1 \cdot s((m+d) \cdot M + n_1 - \theta_1)$$

$$z_{2,m+d}(n_2) = a(n_2) \cdot A_2 \cdot s((m+d) \cdot M + n_2 - \theta_2)$$

where $A_1$ and $A_2$ are complex amplitudes of the received signals, $\theta_1$ and $\theta_2$ are the signal delays, m is the transform frame number, M is the number of samples between start of two adjacent frames. The frame shifts, d, can be $\pm 1$ or zero, but could be expanded to other values, as long as there remains any correlation between the two frames, $z_{1,m+d}(n_1)$ and $z_{0,m}(n_0)$.

We also assume a synthetic reference with corresponding time-domain representation $$z_{0,m}(n_0) = a(n_0) \cdot A_0 \cdot s(m \cdot M + n_0 - \theta_0).$$

Further, we assume that $WW^*=1$ holds for the frequency domain window in FIG. 2, at least for the set of transform bins k where we have desired signal. Thus, it will disappear in the correlation formulas below.

We first derive the correlation between a complex version of the signal from RP 1, and a complex synthetic reference, in the transform domain.

$$C_{Zd,10}(k) = E\{Z_{1,m+d}(k) \cdot Z_{0,m}^*(k)\} =$$

$$A_1 \cdot A_0^* \cdot \sum_{n_1,n_0} a(n_1) \cdot a^*(n_0) \cdot r_s(n_1 - n_0 + d \cdot M - \theta_{10}) e^{-i\frac{2\pi}{N}k(n_1 - n_0)},$$

where k is the transform bin number, $\theta_{10}=\theta_1-\theta_0$ and $r_s(\tau)=E\{s(t+\tau)s^*(t)\}$, since we assume time independent auto correlation of $s(t)$.

Changing one summation variable to be $n=(n_1-n_0+d\cdot M-\theta_{10})$ gives $$C_{Zd,10}(k) = A_1 \cdot A_0^* \cdot \sum_{n,n_0} a(n_0 + n + \theta_{10} - d \cdot M) \cdot a^*(n_0) \cdot$$

$$r_s(n)e^{-i\frac{2\pi}{N}k(n+\theta_{10}-d\cdot M)} = A_1 \cdot A_0^* \cdot \sum_{n,n_0} h_a(n_0 + n + \theta_{10} - d \cdot M) \cdot h_a(n_0) \cdot$$

$$v^*(n + \theta_{10} - d \cdot M) \cdot r_s(n)e^{-i\frac{2\pi}{N}k(n+\theta_{10}-d\cdot M)}$$

In the last step we have used that the window $a(n)=h_a(n)\cdot v^*(n)$, where $$v(n) = e^{i\frac{\pi}{N}n}.$$

Typically $h_a(n)$ is a smooth window such as Kaiser-Bessel-derived, or a Kaiser window, having low sidelobe levels while not too wide main lobe.

Inserting $$e^{i\frac{2\pi}{N}kdM} = (-1)^{kd}$$

and inserting the time correlation for $h_a(n_0)$ as $r_{ha}(\tau)=\sum_{n_0} h_a(n_0+\tau)\cdot h_a(n_0)$ gives $$C_{Zd,10}(k) =$$

$$(-1)^{kd} \cdot A_1 \cdot A_0^* \cdot \sum_n r_{ha}(n + \theta_{10} - d \cdot M) \cdot v^*(n + \theta_{10} - d \cdot M) \cdot r_s(n)e^{-i\frac{2\pi}{N}k(n+\theta_{10})}$$

Using $v^*(n + \theta_{10} - d \cdot M) = e^{-i\frac{\pi}{N}((n+\theta_{10}-d\cdot M))} = i^d \cdot e^{-i\frac{\pi}{N}\cdot(n+\theta_{10})}$ gives $$C_{Zd,10}(k) =$$

$$i^d \cdot (-1)^{kd} \cdot A_1 \cdot A_0^* \cdot \sum_n r_{ha}(n + \theta_{10} - d \cdot M) \cdot r_s(n) \cdot e^{-i\frac{\pi}{N}(n+\theta_{10})} \cdot e^{-i\frac{2\pi}{N}k(n+\theta_{10})}$$

and after breaking out the dependency of $\theta_{10}$ we get $$C_{Zd,10}(k) =$$

$$i^d \cdot (-1)^{kd} \cdot e^{-i\frac{\pi}{N}(2k+1)\theta_{10}} \cdot A_1 \cdot A_0^* \cdot \sum_n r_{ha}(n + \theta_{10} - d \cdot M) \cdot r_s(n) \cdot e^{-i\frac{\pi}{N}(2k+1)n}.$$

We now use double length for the DFT, $N_2=2\cdot N$, since the length of the time data is essential doubled, due to the correlation expression $r_{ha}(\tau)$:

$$C_{Zd,10}(k) = \left\{ i^d \cdot (-1)^{kd} \cdot e^{-i\frac{2\pi}{N_2}k_1\theta_{10}} \cdot A_1 \cdot A_0^* \cdot \right.$$

$$\left. \sum_n r_{ha}(n + \theta_{10} - d \cdot M) \cdot r_s(n)e^{-i\frac{2\pi}{N_2}k_1 n} \right\}_{k_1=2k+1},$$

where we only use odd $k_1=2k+1$, but for the analysis we may need all $k_1$.

The sum is a DFT of the product $r_{ha}(n+\theta_{10}-d\cdot M)\cdot r_s(n)$, which corresponds to a convolution in the frequency domain $$C_{Zd,10}(k) = i^d \cdot (-1)^{kd} \cdot e^{-i\frac{2\pi}{N_2}k_1\theta_{10}} \cdot A_1 \cdot A_0^* \cdot R_{ha(n+\theta_{10}-d\cdot M)}(k_1) * R_s(k_1),$$

where $R_s(k_1)=dft(r_s(n), N_2)$ and $R_{ha(n+\theta_{10}-d\cdot M)}(k_1)=dft(r_{ha}(n+\theta_{10}-d\cdot M), N_2)$.

Since $R_s(k_1)$ is slowly varying in the passband and $R_{ha(n+\theta_{10}-d\cdot M)}(k_1)$ essentially is concentrated around $k_1=0$, we might use the approximation $$C_{Zd,10}(k) \approx i^d \cdot (-1)^{kd} \cdot e^{-i\frac{2\pi}{N_2}k_1\theta_{10}} \cdot A_1 \cdot A_0^* \cdot r_{ha}(dM - \theta_{10}) \cdot R_s(2k+1).$$

If both the signal and the reference are complex-valued, delay difference between them could be determined unambiguously from correlation for same frame (d=0), e.g., based on the phase slope (from the exponential function):

$$C_{Z0,10}(k) \approx e^{-i\frac{2\pi}{N_2}k_1\theta_{10}} \cdot A_1 \cdot A_0^* \cdot r_{ha}(-\theta_{10}) \cdot R_s(2k+1).$$

In the same way, one could correlate the signal at RP2 and the complex reference to determine $C_{Z0,20}(k)$ and determine that delay difference. Then, the time-difference between RP1 and RP2 could be found by taking the difference between the two delay-difference estimates. Alternatively, one could divide the correlation estimates and determine delay-difference from this ratio, but this will be more sensitive to noise.

However, due to the property of transform coding, we don't have access to complex-valued bin coefficients from the received data. This means that a modified method is used. In the following, we propose two different methods, one for real-valued synthetic reference and one for complex-valued synthetic reference.

Real-Valued Synthetic Reference and Real-Valued Received Signal in Transform Domain In this section we will derive expressions for the complex cross-correlation when both the received signal and the synthetic reference has real-valued coefficients.

Correlation of real-valued signals with a real-valued synthetic reference signal is based on same-frame correlation to get the real part, and adjacent frame correlation to get the imaginary part of the cross-correlation.

We get the correlation from only the real parts of the frequency data, between signal from RP1 and a real-valued synthetic reference as $$C_{Xd,10}(k) = E\{X_{1,m+d}(k) \cdot X_{0,m}^*(k)\} =$$

$$\frac{\text{Re}\left[E\{Z_{1,m+d}(k) \cdot Z_{0,m}^*(k)\}\right]}{2} = \frac{\text{Re}\left[C_{Zd}(k)\right]}{2},$$

since X and Y are assumed uncorrelated and both having the same statistics.

Using the approximation from above, we get the following:

Specifically, for d=1, −1 and 0, we have the correlations that are available from the real parts in the transform domain $$\begin{cases} C_{X1,10}(k) = -\dfrac{(-1)^k \cdot \sin\left(\dfrac{2\pi}{N}k\theta_{10}\right)}{2} \cdot A_1 \cdot A_0^* \cdot \left[R_{ha(n+\theta_{10}-M)}(k_1) * R_s(k_1)\right]_{k_1=2k+1} \\[3em] C_{X-1,\,10}(k) = \dfrac{(-1)^k \cdot \sin\left(\dfrac{2\pi}{N}k\theta_{10}\right)}{2} \cdot A_1 \cdot A_0^* \cdot \left[R_{ha(n+\theta_{10}+M)}(k_1) * R_s(k_1)\right]_{k_1=2k+1} \\[3em] C_{X0,10}(k) = \dfrac{\cos\left(\dfrac{2\pi}{N}k\theta_{10}\right)}{2} \cdot A_1 \cdot A_0^* \cdot \left[R_{ha(n+\theta_{10})}(k_1) * R_s(k_1)\right]_{k_1=2k+1} \end{cases}$$

which can be approximated as $$\begin{cases} C_{X1,10}(k) \approx -\dfrac{(-1)^k \cdot \sin\left(\dfrac{2\pi}{N}k\theta_{10}\right)}{2} \cdot A_1 \cdot A_0^* \cdot r_{ha}(M - \theta_{10}) \cdot R_s(2k+1) \\[3em] C_{X-1,10}(k) \approx \dfrac{(-1)^k \cdot \sin\left(\dfrac{2\pi}{N}k\theta_{10}\right)}{2} \cdot A_1 \cdot A_0^* \cdot r_{ha}(-M - \theta_{10}) \cdot R_s(2k+1) \\[3em] C_{X0,10}(k) \approx \dfrac{\cos\left(\dfrac{2\pi}{N}k\theta_{10}\right)}{2} \cdot A_1 \cdot A_0^* \cdot r_{ha}(-\theta_{10}) \cdot R_s(2k+1) \end{cases}$$

respectively, where we also included the approximation of the autocorrelation from above.

Now, we assume that we have access to sequences of frames $X_{0,m}(k)$ and $X_{1,m}(k)$, which we utilize to estimate $C_{Xd,10}(k)=E\{X_{1,m+d}(k) \cdot X_{0,m}(k)\}$ as $$\hat{C}_{Xd,10}(k) = \sum_m X_{1,m+d}(k) \cdot X_{0,m}^*(k)$$

Further, we assume for simplicity, and without loss of generality, that the synthetic reference has amplitude $A_0=1$ and that the transmitted signal spectrum is flat within the bandwidth of interest (if it is not flat, we could normalize it by individual scaling of frequency bins). The complex cross-correlation estimate between signal 1 and the real-valued synthetic reference can now be written as $$\hat{Q}_{z,10}(k) = \frac{\hat{Q}_0(k)}{\rho_{ha}(-\theta_{10})} + \frac{i}{2 \cdot (-1)^k}\left(\frac{\hat{Q}_{-1}(k)}{\rho_{ha}(M-\theta_{10})} - \frac{\hat{Q}_{+1}(k)}{\rho_{ha}(-M-\theta_{10})}\right) \approx$$

$$A_1\left\{\cos\left(\frac{2\pi}{N}k\theta_{10}\right) + i\sin\left(\frac{2\pi}{N}k\theta_{10}\right)\right\} = A_1 e^{\frac{i2\pi}{N}k\theta_{10}}.$$

Complex-Valued Synthetic Reference and Real-Valued Received Signal in Transform Domain In this section we will derive expressions for the complex cross-correlation when the received signal has real-valued coefficients while the synthetic reference is complex-valued. This is referred to half-complex cross-correlation herein.

Above, it was presented derivations for correlation between complex signals with a complex conjugate on the reference. We use these results together with the below derivation of a correlation-like expression without complex conjugate on the synthetic reference:

$$E\{w_{Zd,10}(k)\} = E\{Z_{1,m+d}(k) \cdot Z_{0,m}(k)\}$$

where $$w_{Zd,10}(k) = Z_{1,m+d}(k) \cdot Z_{0,m}(k) = \sum_{n_1,n_0} a(n_1) \cdot a(n_0) \cdot$$

$$s((m+d) \cdot M + n_1 - \theta_1) \cdot s(m \cdot M + n_2 - \theta_0) \cdot e^{-i\frac{2\pi}{N}k(n_1+n_0+d \cdot M - (\theta_1+\theta_0))},$$

or with short time notations $$w_{Zd,10}(k) = \sum_{n_1,n_0} a(n_1) \cdot a(n_0) \cdot s(t_1) \cdot s(t_0) \cdot e^{-i\frac{2\pi}{N}k(t_1+t_0)},$$

With $s(t) = s_x(t) + i \cdot s_y(t)$ we have $$s(t_1) \cdot s(t_0) = (s_x(t_1) + i \cdot s_y(t_1)) \cdot (s_x(t_0) + i \cdot s_y(t_0)) =$$

$$s_x(t_1) \cdot s_x(t_0) - s_y(t_1) \cdot s_y(t_0) + i \cdot s_x(t_1)s_y(t_0) + i \cdot s_y(t_1)s_x(t_0)$$

Assuming $s_x(t_1)$ and $s_y(t_0)$ having the same statistics, being uncorrelated and having zero means, makes the corresponding expectations being zero, i.e.

$$E\{s(t_1) \cdot s(t_0)\} = E\{s_x(t_1) \cdot s_x(t_0)\} -$$

$$E\{s_y(t_1) \cdot s_y(t_0)\} + i \cdot E\{s_x(t_1)\}E\{s_y(t_0)\} + i \cdot E\{s_y(t_1)\}E\{s_x(t_0)\},$$

Where the first two terms cancel each other, and the two last terms are zero.

Thus, we have $$E\{w_{zd,10}(k)\} =$$

$$E\{Z_{1,m+d}(k) \cdot Z_{0,m}(k)\} = \sum_{n_1,n_0} a(n_1) \cdot a(n_0) \cdot E\{s(t_1) \cdot s(t_0)\} \cdot e^{-i\frac{2\pi}{N}k(t_1+t_0)} = 0$$

Based on the above results and results from the basic derivations section above, we will show that correlating a received real-valued transform-domain signal with a complex-valued synthetic reference in transform domain can be used to estimate a complex-valued cross-correlation.

The correlation of the real-valued received data with a complex-valued reference, becomes $$C_{XZd,10}(k) = E\{X_{1,m+d}(k) \cdot Z_{0,m}^*(k)\} = E\left\{ \frac{Z_{1,m+d}(k) + Z_{1,m+d}^*(k)}{2} \cdot Z_{0,m}^*(k) \right\} =$$

$$\frac{1}{2}C_{Zd}(k) + \frac{1}{2}E\{Z_{1,m+d}^*(k) \cdot Z_{0,m}^*(k)\} = \frac{1}{2}C_{Zd}(k) + \frac{1}{2}E\{w_{Zd}^*(k)\}$$

where the first term in the last expression contains the desired complex cross-correlation, and the second term can be seen as a signal-dependent noise or self-interference with expectation equal to zero. This means that we get a complex-valued cross-correlation by only correlating signals for same transform frame, which is unexpected since the received signal only has real-valued coefficients. As opposed to the procedure above, $n_0$ correlations between adjacent frames are needed.

Using the approximation from above, we get the following:

Specifically, for $d=1, -1$ and $0$, we have the correlations that are available from correlating the received real parts in the transform domain with a complex-valued synthetic reference $$\begin{cases} C_{X1,10}(k) = i \cdot (-1)^k \cdot e^{-i\frac{2\pi}{N}k\theta_{10}} \cdot A_1 \cdot A_0^* \cdot \\ \left[ R_{ha(n+\theta_{10}-M)}(k_1) * R_s(k_1) \right]_{k_1=2k+1} \\ C_{X-1,10}(k) = -i \cdot (-1)^k \cdot e^{-i\frac{2\pi}{N}k\theta_{10}} \cdot A_1 \cdot A_0^* \cdot \\ \left[ R_{ha(n+\theta_{10}+M)}(k_1) * R_s(k_1) \right]_{k_1=2k+1} \\ C_{X0,10}(k) = e^{-i\frac{2\pi}{N}k\theta_{10}} \cdot A_1 \cdot A_0^* \cdot \\ \left[ R_{ha(n+\theta_{10})}(k_1) * R_s(k_1) \right]_{k_1=2k+1} \end{cases}$$

which can be approximated as $$\begin{cases} C_{X1,10}(k) \approx i \cdot (-1)^k \cdot e^{-i\frac{2\pi}{N}k\theta_{10}} \cdot \\ A_1 \cdot A_0^* \cdot r_{ha}(M - \theta_{10}) \cdot R_s(2k+1) \\ C_{X-1,10}(k) \approx -i \cdot (-1)^k \cdot e^{-i\frac{2\pi}{N}k\theta_{10}} \cdot \\ A_1 \cdot A_0^* \cdot r_{ha}(-M - \theta_{10}) \cdot R_s(2k+1) \\ C_{X0,10}(k) \approx e^{-i\frac{2\pi}{N}k\theta_{10}} \cdot A_1 \cdot \\ A_0^* \cdot r_{ha}(-\theta_{10}) \cdot R_s(2k+1) \end{cases}$$

respectively, where we also included the approximation from above.

We can observe from the formulas above that all information is available in the same-frame correlation, $C_{X0,10}(k)$, and since for typical transform windows, $r_{ha}(-\theta_{10}) \gg r_{ha}(\pm M - \theta_{10})$, same-frame correlation has larger magnitude and thus also higher SNR (Signal-to-Noise Ratio) than adjacent-frame correlations. Therefore, when a complex reference is available, it is better to only use the same-frame correlation ($d=0$). It would also be possible to estimate the imaginary part from both same-frame and adjacent-frame correlation and then combine the two estimates based on their SNR, but this will increase the complexity significantly without much benefit.

Now, we assume that we have access to sequences of frames $Z_{0,m}(k)$ and $X_{1,m}(k)$, which we utilize to estimate $C_{XZ0,10}(k) = E\{X_{1,m}(k) \cdot Z_{0,m}^*(k)\}$ as $$\hat{C}_{XZ0,10}(k) = \sum_m X_{1,m}(k) \cdot Z_{0,m}^*(k)$$

Also here, we assume for simplicity that the synthetic reference has amplitude $A_0=1$ and that the transmitted signal spectrum is flat within the bandwidth of interest, i.e., $R_s(2k+1)=1$. If it is not flat, we could normalize it by individual scaling of frequency bins. The complex cross-correlation estimate between signal 1 and the complex-valued synthetic reference can now be written as $$\hat{Q}_{z,10}(k) = \hat{C}_{XZ0,10}(k) \approx e^{-i\frac{2\pi}{N}k\theta} \cdot A_1 \cdot r_{ha}(-\theta).$$

Optional Normalization of Frequency-Domain Correlations

With synthetic reference, normalization of the complex-valued frequency-domain cross-correlation is not needed to estimate relative magnitude when the transmitted signal spectrum is flat. However, if transmitted spectrum is not flat, or if the receive signal chain in the reception points have significant frequency-domain ripple, it might be beneficial to compensate at least partially by scaling frequency bins individually. Such compensation can be based on calculated or measured values, and stored in a memory.

Transforming the Complex Cross-Correlation to Time-Domain

It is typically easier to determine e.g., time-delay difference in time-domain than in frequency domain, especially if there is multipath propagation due to reflections etc. Therefore, the determined complex-valued cross-correlations can be transformed to time-domain using e.g., an IFFT and then a suitable peak-finding method is applied. Different peak-finding methods are available, as known per se. Oversampling of the IFFT helps to improve precision of the time delay estimates but other interpolation methods or model-based approaches are also possible to use.

Numerical Results

This section contains numerical results when the invention is applied to a 100 MHz 5G NR carrier with 30 kHz subcarrier spacing. The cross-correlation in transform frequency domain is averaged over the number of transforms contained in a single OFDM (Orthogonal Frequency-Division Multiplex) symbol.

Here, Table 1 shows performance of time-difference estimate between one transmitted signal received by both RP0 and RP1, based on a simulation. For peer-signal reference, signals are correlated against each other, which directly gives the time difference when the time-domain peak has been found. For synthetic reference, the signals are individually correlated against the reference and then the time difference is calculated as the difference between two estimates. The time differences are then converted to path-length difference using the speed of light. The transmitted signal is subject to AWGN (Additive White Gaussian Noise) channels with random delay per simulation iteration. As can be seen from the results, synthetic reference is superior when SNR levels are low, and complex-valued synthetic reference is always better than using a received signal as reference.

TABLE 1

Standard deviation in meter units, for different cross-correlation methods when one time-delay estimate is provided per OFDM symbol and converted to distance units. For each test case, there are 400 simulations with random delay difference.

| Test case config | | Standard deviation of estimated time difference between RP0 and RP1 signals, converted to distance in meter | | |
|---|---|---|---|---|
| | | RP0 signal as | | Complex- |
| RP0 SNR (dB) | RP1 SNR (dB) | reference (peer-signal reference) | Real-valued synthetic Ref. | valued synthetic Ref. |
| 20 | 20 | 0.030 | 0.035 | 0.005 |
| 20 | 10 | 0.059 | 0.060 | 0.009 |
| 20 | 0 | 0.177 | 0.175 | 0.026 |
| 10 | 0 | 0.196 | 0.177 | 0.028 |
| 0 | 0 | 5.575 | 0.240 | 0.036 |

Figure 3A:
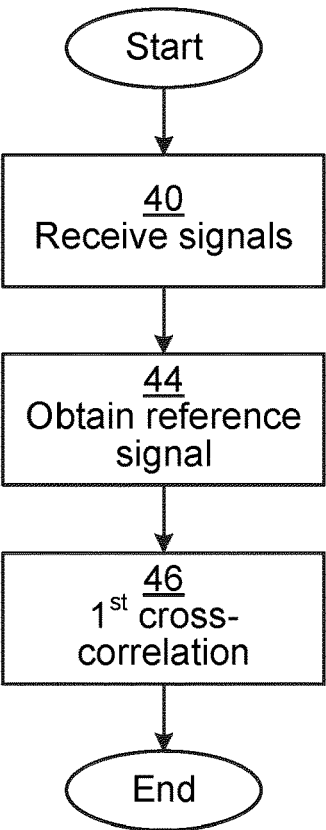
FIGS. 3A-B are flow charts illustrating embodiments of methods for determining a relation between a first time-domain signal and a second time-domain signal received from a single source by one or more antennas.
Figure 3B:
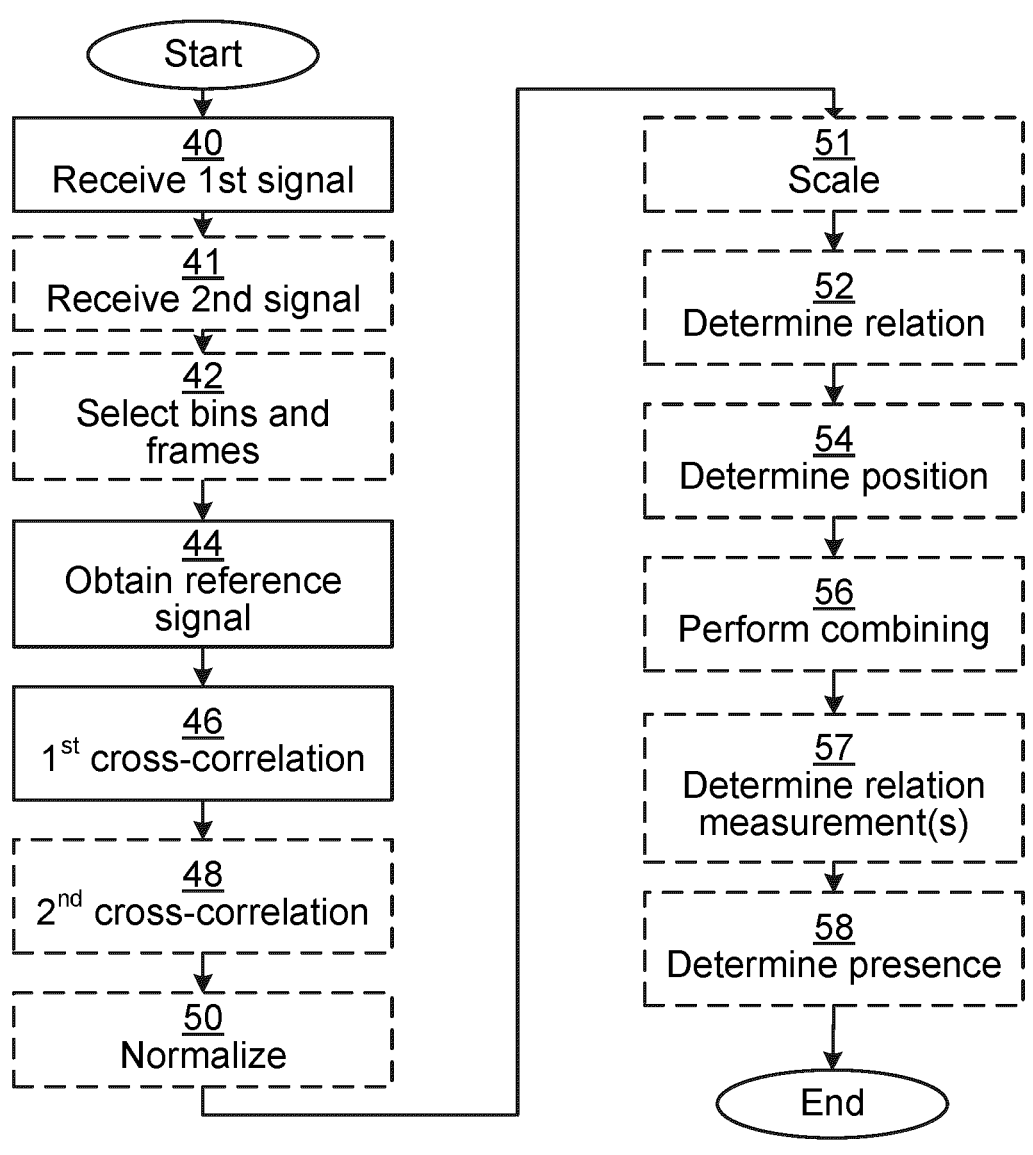

FIGS. 3A-B are flow charts illustrating embodiments of methods for evaluating a first time-domain signal 7a received, from a single source 2, 5a-c, by one or more antennas 5a-c. As explained above, the time domain signal 7a is processed with a Fourier-related transform with overlapping input frames to indirectly or directly provide a first frequency-domain signal 6a. The first frequency-domain signal is made up of frames of frequency-domain coefficients, wherein only one part, of the real part and the imaginary part from the Fourier-related transform, is included in the first frequency-domain signal 6a. When the transform provides the frequency domain signals 6a-b directly, the Fourier-related transform can be configured to provide coefficients of only one part (real or imaginary). When the transform provides the frequency domain signals 6a-b indirectly, the coefficients can be stripped of one part (real or imaginary) after they are provided as a result of the transform.

A first part is the part, real or imaginary, that is included in the frequency-domain signal 6a and a second part is the part, real or imaginary, that is not included in the frequency-domain signal 6a. Hence, when the first part is the imaginary part, the second part is the real part, or vice versa. The method is performed by the signal evaluator 1. First, embodiments illustrated by FIG. 3A will be described.

In a receive 1st signal step 40, the signal evaluator 1 receives the first frequency-domain signal 6a. The first frequency-domain signal only comprises coefficients of the first part. The first frequency-domain signal 6a can be received from a first converter device 3a and corresponding antenna 5a.

In an obtain reference signal step 44, the signal evaluator 1 obtains a reference frequency-domain signal 6'. Optionally, this step comprises obtaining a time-domain reference signal and converting the time-domain reference signal to the frequency-domain reference signal 6'. This conversion comprises a process similar to the processing to obtain the first frequency-domain signal 6a, i.e. the Fourier-related transform. However, the reference frequency-domain signal 6' can have complex valued coefficients.

The time-domain reference signal can be a sounding reference signal, SRS. Alternatively, the time-domain reference signal can be a demodulation reference signal, DMRS. SRS and DMRS are signals that UEs normally transmit on occasion, which can conveniently be exploited by embodiments presented herein.

Alternatively, the reference frequency-domain signal 6' can be based on a signal that was transmitted by an antenna associated with the signal evaluator 1, i.e. forming part of the same base station device 9.

Alternatively, the reference frequency-domain signal can be a regular downlink signal, or a signal specially configured for sensing purposes.

Optionally, as described in more detail below, the reference frequency-domain signal can be obtained by generating frequency-domain coefficients for a subset of transforms associated with an OFDM symbol, by phase rotation of frequency-domain coefficients for a different subset of transforms associated with the OFDM symbol. The phase rotation is based on one or more of comb offset and frequency shift of the carrier.

In a 1st cross-correlation step 46, the signal evaluator 1 determines a first cross-correlation between the received first frequency-domain signal 6a and the reference frequency-domain signal 6' by cross-correlating the received first frequency-domain signal 6a and the reference frequency-domain signal 6'. As explained above, the equivalent of a time-domain cross-correlation is achieved by elementwise multiplication (and averaging) in the frequency-domain.

In one embodiment, the reference frequency-domain signal 6' comprises complex value coefficients, whereby the cross-correlation(s) are half-complex cross-correlation(s), as detailed above.

Looking now to FIG. 3B, only new or modified steps compared to FIG. 3A will be described.

In an optional receive 2nd signal step 41, the signal evaluator 1 receives 41 a second frequency-domain signal 6b being made up of frames of frequency-domain coefficients, wherein only the first part from the Fourier-related transform is included in the second frequency-domain signal 6*b*. The second frequency-domain signal can be received 6*b* from a second converter 3*b* and corresponding antenna 5*b*.

In an optional select bins and frames step 42, the signal evaluator 1 selects bins and frames to use for the first part cross-correlation and second part cross-correlation based on bins and frames assigned for a particular user. In this way, only data relating to a single user (or more specifically user device) is evaluated, to thereby target the evaluation of cross-correlation for only that user.

In an optional 2$^{nd}$ cross-correlation step 48, the signal evaluator 1 determines a second cross-correlation between the received second frequency-domain signal 6*b* and the reference frequency-domain signal 6' by cross-correlating the received second frequency-domain signal 6*b* and the reference frequency-domain signal 6'.

In an embodiment where the reference frequency-domain signal 6' only includes coefficient values being of the first part, the determine 1$^{st}$ cross-correlation and determine 2$^{nd}$ cross correlation steps each comprises two sub-steps.

In a first sub-step, the signal evaluator 1 determines a first part cross-correlation between the respective received, first or second, frequency-domain signal 6*a*, 6*b* and the reference frequency-domain signal 6' by cross-correlating corresponding frames in the respective received frequency-domain signal 6*a*, 6*b* and the reference frequency-domain signal 6', for the first part.

In a second sub-step, the signal evaluator 1 determines a second part cross-correlation between the respective received frequency-domain signal 6*a* and the reference frequency-domain signal 6' by cross-correlating non-corresponding frames in the respective received frequency-domain signal 6*a*, 6*b* and the reference frequency-domain signal 6', for the second part. Optionally, the determining a second part cross-correlation is performed for frames where the frame in the first frequency-domain signal 6*a* is one frame ahead of the frame in the second frequency-domain signal 6*b*, and/or vice versa.

In an optional normalize step 50, the signal evaluator 1 normalizes cross-correlation(s) on a bin-by-bin basis. When applicable, the normalising can be performed equally for the first part cross-correlation and the second part cross-correlation.

In an optional scale step 51, the signal evaluator 1 scales the cross-correlations to enable time-domain alias cancellation. The scaling also allows the control of the trade-off between SNR and amount of alias cancellation.

In an optional determine relation step 52, the signal evaluator 1 determines a relation between the first frequency-domain signal 6*a* and the second frequency-domain signal 6*b* based on the results of the first cross-correlation and the second cross-correlation.

Optionally, the determining a relation between the first frequency-domain signal 6*a* and the second frequency-domain signal 6*b* comprises determining a time difference, phase difference, or power ratio, between the first frequency-domain signal 6*a* and the second frequency-domain signal 6*b*. The power ratio can be expressed in dB, thus expressing how different or similar two power measurements are.

In an optional determine position step 54, the signal evaluator 1 determines a position of the single source 2 based on at least one of the time difference, phase difference and power ratio. For instance, the single source 2 can be positioned based on multi-lateration of a time-difference on arrival and/or power ratio.

In an optional perform combining step 56, the signal evaluator 1 performs signal combining based on at least one of the time difference, the phase difference and the power ratio. As mentioned above, the information from the correlation can be exploited to improve the combining e.g. for co-phasing based on time-difference and/or phase-difference estimates, and/or for scaling based on power ratio to achieve Maximal-Ratio Combining.

In an optional determine relation measurement(s) step 57, the signal evaluator 1 determines a time difference, phase difference, power ratio, or channel impulse response between the reference frequency-domain signal and the first frequency-domain signal 6*a* based on the first cross-correlation.

In an optional determine presence step 58, the signal evaluator 1 determines presence of an object based on the channel impulse response.

Figures 4, 5, 6:
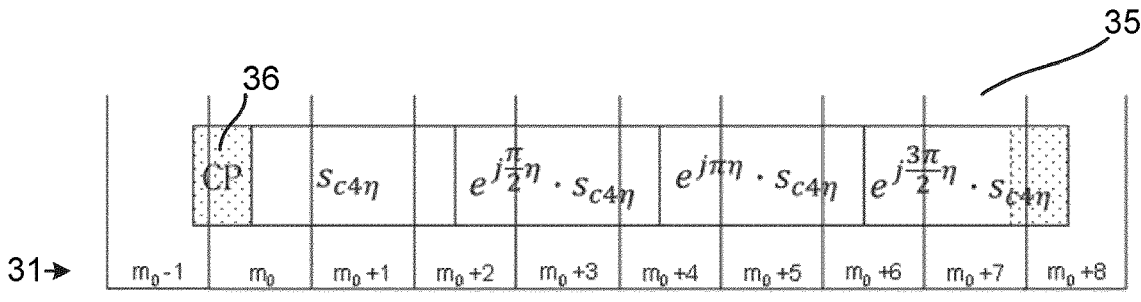
FIGS. 4 and 5 illustrates an example of the relationship between OFDM (Orthogonal Frequency-Division Multiplex) symbols in an NR (New Radio) slot with 30 kHz subcarrier spacing and the transform coding frames with 120 kHz bin resolution.
FIG. 6 is a schematic diagram illustrating an example of a comb-4 symbol where bin resolution is 120 kHz and OFDM SCS is 30 kHz.

FIGS. 4 and 5 illustrates an example of the relationship between OFDM symbols in an NR slot with 30 kHz sub-carrier spacing and the transform coding frames with 120 kHz bin resolution. The labels 31 at the bottom part indicate transform sequence numbers, i.e. starting frame numbers. The solid vertical lines 33 indicate the demarcation between OFDM symbols. The dashed vertical lines indicate the end of cyclic prefix (CP). This example is for NR with 30 kHz Sub-carrier spacing (SCS), where the slot length is 0.5 millisecond. A section 30 of FIG. 4 is shown zoomed in, in FIG. 5.

In 5G NR, SRS uses a comb pattern where one SRS sequence only uses every 2$^{nd}$, 4$^{th}$, or 8$^{th}$ subcarrier. If the bin resolution is larger than the subcarrier spacing of the 5G NR carrier, it might be necessary to keep all bins when storing the synthetic reference in transform coding domain, which means that more memory is needed compared with the case when the signal is stored in OFDM spectrum.

For a comb-spectrum OFDM signal with one out of every k subcarriers occupied (denoted Comb-κ), it can be shown that the time-domain representation of the OFDM-symbol contains κ copies with different phase rotation. The phase rotation depends on the offset into the comb and this offset is counted as the minimum distance from any of the non-zero subcarriers to DC (Direct Current), in units of the subcarrier spacing. For example, offset n=0 means that one of the occupied subcarriers is at DC frequency, while offset n=1 means that one of the occupied subcarriers coincides with the first positive-frequency subcarrier etc. Non-integer offsets can be used e.g., if the carrier is not centred properly in the complex baseband representation.

A numerical example we now be described with a 100 MHz NR carrier using 30 kHz subcarrier spacing and a transform coding solution using 120 kHz subcarrier spacing. Due to the 50% overlap in transform coding, at least 2×120 000/30 000=8 transforms will be started every OFDM symbol. Due to CPs extending the length of the OFDM symbol, transform start will not be synchronized with the OFDM symbol start, and there might be nine transforms started in some of the symbols. FIG. 4 shows an example with 120 transforms started during one NR slot with 14 OFDM symbols. FIG. 5 zooms in on a section 30 covering the last two symbols (12 and 13) of FIG. 4, where it is seen that the CP of symbol 12 starts at around transform 103 and the symbol ends in the middle of transform frame 111. It should be noted that each transform processes two adjacent frames, which means that only transforms starting at frames 103-109 are completely inside OFDM symbol 12.

Since each transform spans two consecutive transform frames, it will typically not be possible to fit eight complete transforms strictly within an OFDM symbol boundary. One can then chose to only use seven transforms that are strictly inside the OFDM symbol, to minimize any interference in the correlation process (e.g., strong UL signal from another UE on adjacent OFDM symbol). For OFDM symbol 12 (second last symbol in FIG. 4), this corresponds to transforms 103-109. Another alternative, that could slightly improve performance in low SNR by correlating over one additional transform, is to also include transforms where a small fraction is outside the OFDM symbol boundaries. This could be a configurable threshold, depending on how SNR is prioritized versus the risk of interference from adjacent symbols. If the adjacent symbol is a transmission gap (such as between DL (downlink) and UL (uplink) slots in LTE and NR using TDD (Time-Division Duplex) mode of operation), the risk of interference should be small.

Since the transform coding has a more coarse frequency resolution than the OFDM signal, we cannot resolve the comb directly in frequency domain, and thus all bins are stored inside the carrier bandwidth, under the assumption that the transmission used the whole carrier bandwidth. However, we can still store the synthetic reference in bin domain in a more compact way.

To understand this possibility, placing of a comb-4 symbol in the transform frame grid at some arbitrary time offset is illustrated in FIG. 6. FIG. 6 is a schematic diagram illustrating an example of a comb-4 symbol where bin resolution is 120 kHz and OFDM SCS is 30 kHz. Even though transforms are not synchronous with the OFDM symbol 35, one can show that $$Z^*_{0,m+2}(k) = e^{j\frac{\pi}{2}\eta} \cdot Z^*_{0,m}(k)$$

for any frame m as long as frames m and m+2 are fully inside the OFDM symbol 35 or its CP 36. In the example in FIG. 6, it would be frames $m_0$ to $m_0+7$. If the OFDM symbol for the synthetic reference was repeated to make it look periodic, the expression would hold also for frames $m_0-1$ and $m_0+8$, i.e., covering a full OFDM symbol length including CP 36. The parameter $\eta$ in the above formula and in FIG. 6 depends on the current comb offset and any frequency shift of the carrier. It is measured in units of the subcarrier spacing and represents the distance from zero frequency to the center of the nearest non-zero valued subcarrier in the comb signal.

This relationship can be utilized to store less information related to the synthetic reference. For example, with Comb-4, we only need to store ¼ of the transforms started in an OFDM symbol period. For the given example, this means that only bins for two (preferably consecutive) transforms need to be stored and the remaining ones can be generated on the fly by repeating the two stored transforms in bin domain and rotating the phase according to FIG. 6. For the same comb-4 example, the phase shift between adjacent copies is $\pi/2\eta$, i.e., a sign flip if $\eta=2$.

The steps to arrive at suitable reference data are as follows:

Generate synthetic reference (e.g., SRS according to the SRS configuration, including a specific offset) and transform to complex-valued frequency-domain coefficients.

Store only frequency domain coefficients for the transforms containing unique information, e.g., the first two transforms completely inside the OFDM symbol for Comb-4 when parameters are set according to the example above Generate remaining frequency-domain coefficients by phase rotation determined from configured comb offset and any frequency shift of the carrier. This can be done on the fly during correlation operation with the synthetic reference.

Depending on the OFDM symbol position relative to transform frames, the first or the last transform might not be used since it could be partially outside the OFDM symbol boundary.

Figure 7A:
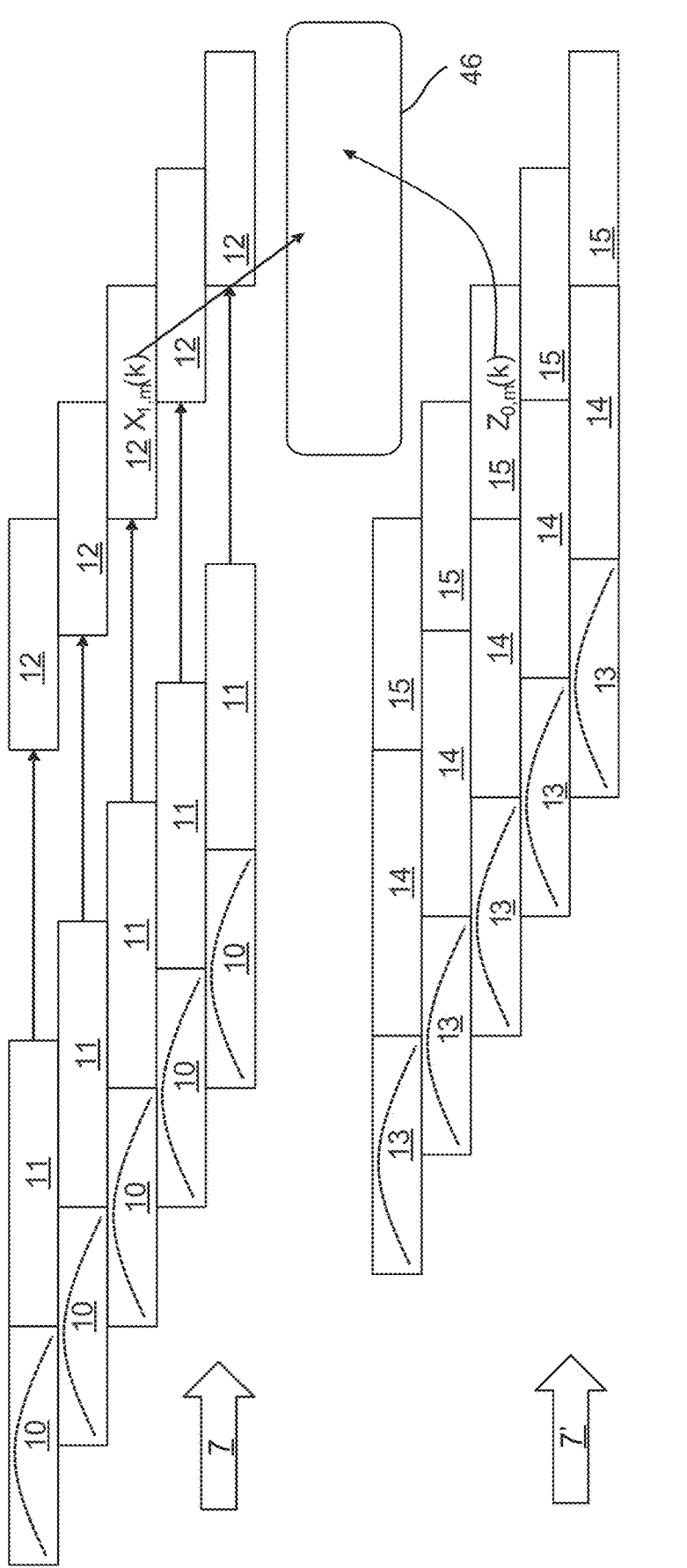
FIGS. 7A-B are schematic diagrams illustrating two embodiments of correlating received signals with reference signals.
Figure 7B:
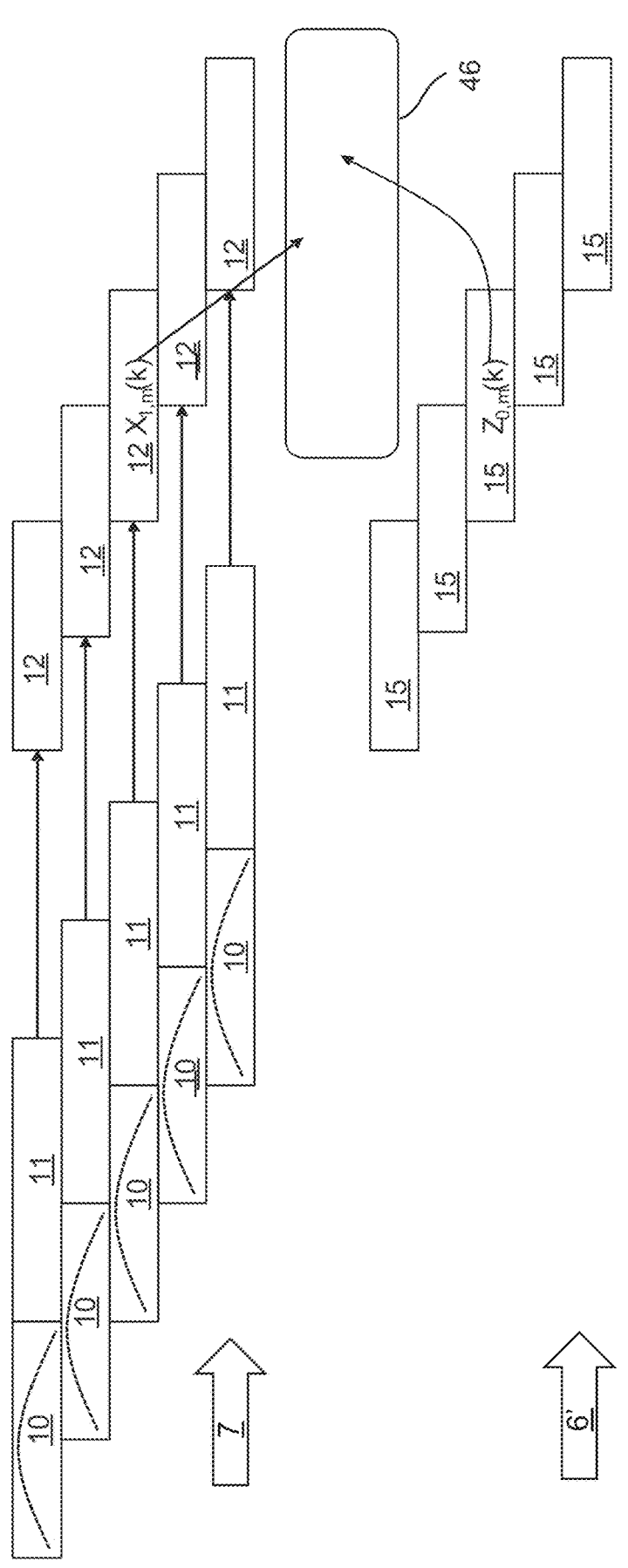

FIGS. 7A-B are schematic diagrams illustrating two embodiments of correlating received signals with reference signals. Time flows from left to right. The upper section illustrates processing of received signals, within which each row represents a new instance of processing of a received signal. The lower section illustrates processing of reference signals, within which each row represents a new instance of processing of reference signals.

Looking first to FIG. 7A, the received signal 7 is input in time-domain sections 10 and is processed 11 as described above with reference to FIG. 2, including a Fourier-related transform, windowing, restricting to only one part (real or imaginary) and quantization. The result is then transferred of fronthaul and stored as one-part (real or imaginary) bin values 12.

Similar processing occurs for reference signals 7'. For each instance of a reference time-domain signal 13, transform processing 14 occurs to transform the signal to a reference frequency-domain signal 15. The processing 14 of the reference signal results in complex-valued coefficients.

This allows the cross-correlation 46 to occur between the received one-part bin values 12 and the reference frequency-domain signals Looking now to FIG. 7B, the processing of the received signal 7 is identical to that of FIG. 7A. In this embodiment, instead of processing reference time-domain signals, the reference frequency-domain signal 6' is obtained and pre-stored. The cross-correlation 46 occurs in the same manner as for the embodiment illustrated in FIG. 7A.

The embodiment illustrated in FIG. 7A requires less storage, but needs a complex-value capable Fourier-related transform. In contrast, the embodiment illustrated in FIG. 7B requires more storage, but reduces the required processing significantly.

Figure 8:
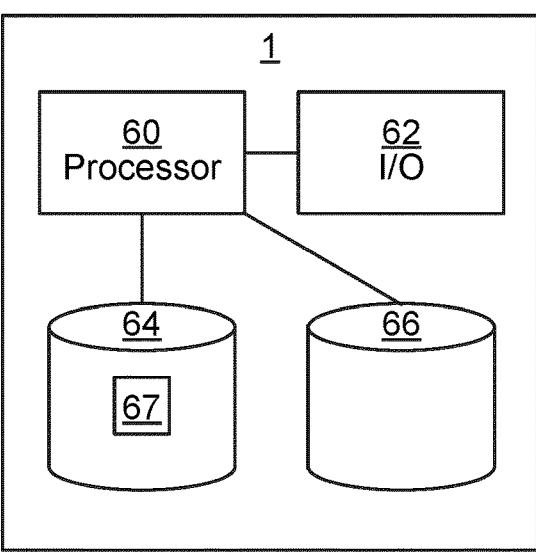
FIG. 8 is a schematic diagram illustrating components of the signal evaluator 1 of FIGS. 1A-B.

FIG. 8 is a schematic diagram illustrating components of the signal evaluator 1 of FIGS. 1A-B. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-B above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The signal evaluator 1 further comprises an I/O interface 62 for communicating with external and/or internal entities.

Other components of the signal evaluator 1 are omitted in order not to obscure the concepts presented herein.

Figure 9:
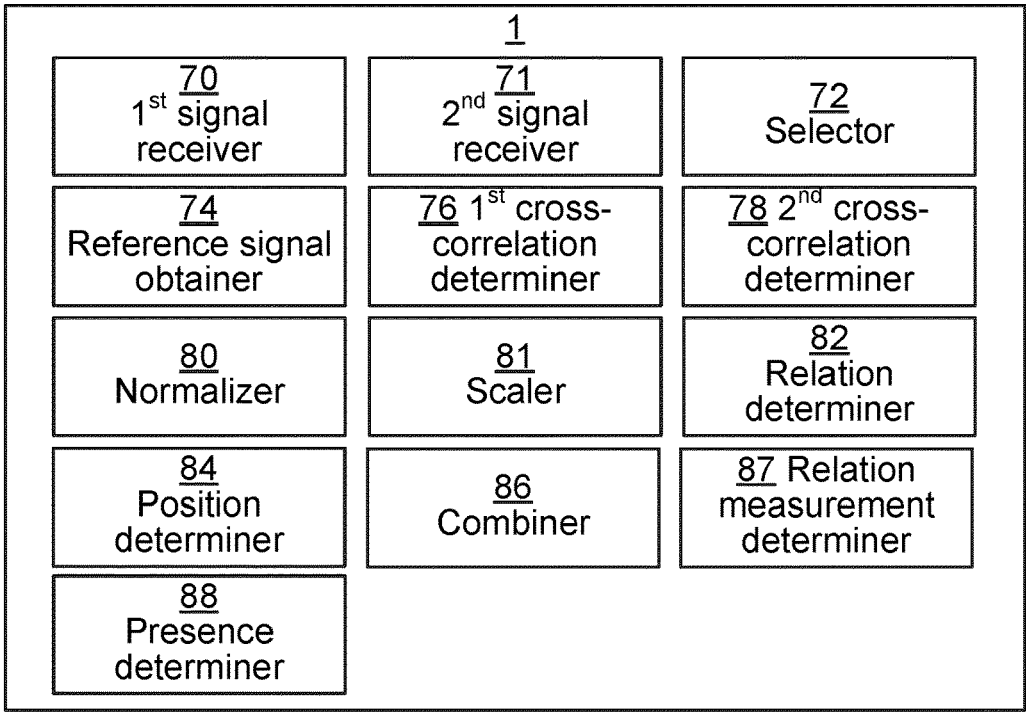
FIG. 9 is a schematic diagram showing functional modules of the signal evaluator of FIGS. 1A-B according to one embodiment.

FIG. 9 is a schematic diagram showing functional modules of the signal evaluator 1 of FIGS. 1A-B according to one embodiment. The modules are implemented using software instructions such as a computer program executing in the signal evaluator 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A-B.

A $1^{st}$ signal receiver 70 corresponds to step 40. A $2^{nd}$ signal receiver corresponds to step 41. A selector 72 corresponds to step 42. A reference signal determiner 74 corresponds to step 44. A $1^{st}$ part cross-correlation determiner 76 corresponds to step 46. A $2^{nd}$ part cross-correlation determiner 78 corresponds to step 48. A normalizer 80 corresponds to step 50. A scaler 81 corresponds to step 51. A relation determiner 82 corresponds to step 52. A position determiner 84 corresponds to step 54. A combiner 86 corresponds to step 56. A relation measurement determiner 87 corresponds to step 57. A presence determiner 88 corresponds to step 58.

Figure 10:
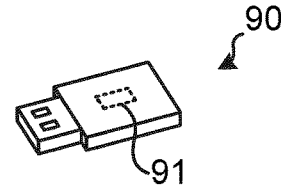
FIG. 10 shows one example of a computer program product comprising computer readable means.

FIG. 10 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 9. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for evaluating a first time-domain signal received from a single source by one or more antennas, wherein the time domain signal is processed with a Fourier-related transform with overlapping input frames to indirectly or directly provide a first frequency-domain signal being made up of frames of frequency-domain coefficients, wherein only one part, of the real part and the imaginary part from the Fourier-related transform, is included in the first frequency-domain signal, wherein a first part is the part, real or imaginary, that is included in the frequency-domain signal and a second part is the part, real or imaginary, that is not included in the frequency-domain signal, the method being performed by a signal evaluator, the method comprising:

receiving the first frequency-domain signal;
 obtaining a reference frequency-domain signal; and
 determining a first cross-correlation between the received first frequency-domain signal and the reference fre-quency-domain signal by cross-correlating the received first frequency-domain signal and the reference fre-quency-domain signal.

2. The method according to claim 1, further comprising:

receiving a second frequency-domain signal being made up of frames of frequency-domain coefficients, wherein only the first part from the Fourier-related transform is included in the second frequency-domain signal;
 determining a second cross-correlation between the received second frequency-domain signal and the reference frequency-domain signal by cross-correlating the received second frequency-domain signal and the reference frequency-domain signal); and
 determining a relation between the first frequency-domain signal and the second frequency-domain signal based on the results of the first cross-correlation and the second cross-correlation.

3. The method according to claim 2, wherein the reference frequency-domain signal only includes coefficient values being of the first part, and wherein the determining a first cross-correlation and determining a second cross-correlation each comprises:

determining a first part cross-correlation between the respective received, first or second, frequency-domain signal and the reference frequency-domain signal by cross-correlating corresponding frames in the respective received frequency-domain signal and the reference frequency-domain signal, for the first part; and
 determining a second part cross-correlation between the respective received frequency-domain signal and the reference frequency-domain signal by cross-correlating non-corresponding frames in the respective received frequency-domain signal and the reference frequency-domain signal, for the second part.

4. The method according to claim 3, wherein, in the determining a second part cross-correlation, the cross-correlation is performed for frames where the frame in the first frequency-domain signal is one frame ahead of the frame in the second frequency-domain signal, and/or vice versa.

5. The method according to claim 2, wherein the determining a relation between the first frequency-domain signal and the second frequency-domain signal comprises determining a time difference, phase difference, or power ratio, between the first frequency-domain signal and the second frequency-domain signal.

6. The method according to claim 5, further comprising:

determining a position of the single source based on at least one of the time difference, phase difference and power ratio.

7. The method according to claim 5, further comprising:

performing signal combining based on at least one of the time difference, the phase difference and the power ratio.

8. The method according to claim 1, wherein the obtaining a reference frequency-domain signal comprises obtaining a time-domain reference signal and converting the time-domain reference signal to the frequency-domain reference signal.

9. The method according to claim 8, wherein the time-domain reference signal is a sounding reference signal, SRS.

10. The method according to claim 8, wherein the time-domain reference signal is a demodulation reference signal, DMRS.

11. The method according to claim 1, wherein the reference frequency-domain signal is based on a signal that was transmitted by an antenna associated with the signal evaluator.

12. The method according to claim 11, wherein the reference frequency domain signal is a regular downlink signal, or a signal specially configured for sensing purposes.

13. The method according to claim 11, further comprising:

determining a time difference, phase difference, power ratio, or channel impulse response between the reference frequency-domain signal and the first frequency-domain signal based on the first cross-correlation.

14. The method according to claim 13, further comprising:

determining presence of an object based on the channel impulse response.

15. The method according to claim 1, wherein the reference frequency-domain signal comprises complex value coefficients, and the cross-correlation(s) are half-complex cross-correlation(s).

16. The method according to claim 1, further comprising:

selecting bins and frames to use for the cross-correlation(s) based on bins and frames assigned for a particular user.

17. The method according to claim 1, further comprising:

normalizing cross-correlation(s) on a bin-by-bin basis.

18. The method according to claim 1, further comprising:

scaling the cross-correlation(s) to enable time-domain alias cancellation.

19. The method according to claim 1, wherein the obtaining a reference frequency-domain signal comprises generating frequency-domain coefficients for a subset of transforms associated with an OFDM symbol, by phase rotation of frequency-domain coefficients for a different subset of transforms associated with the OFDM symbol, wherein the phase rotation is based on one or more of comb offset and frequency shift of the carrier.

20. A signal evaluator for evaluating a first time-domain signal received from a single source by one or more antennas, wherein the time domain signal is processed with a Fourier-related transform with overlapping input frames to indirectly or directly provide a first frequency-domain signal being made up of frames of frequency-domain coefficients, wherein only one part, of the real part and the imaginary part from the Fourier-related transform, is included in the first frequency-domain signal, wherein a first part is the part, real or imaginary, that is included in the frequency-domain signal and a second part is the part, real or imaginary, that is not included in the frequency-domain signal, the signal evaluator comprising:

a processor; and a memory storing instructions that, when executed by the processor, cause the signal evaluator to:

receive the first frequency-domain signal;

obtain a reference frequency-domain signal; and determine a first cross-correlation between the received first frequency-domain signal and the reference frequency-domain signal by cross-correlating the received first frequency-domain signal and the reference frequency-domain signal.

21. The signal evaluator according to claim 20, further comprising instructions that, when executed by the processor, cause the signal evaluator to:

receive a second frequency-domain signal being made up of frames of frequency-domain coefficients, wherein only the first part from the Fourier-related transform is included in the second frequency-domain signal;

determine a second cross-correlation between the received second frequency-domain signal and the reference frequency-domain signal by cross-correlating the received second frequency-domain signal and the reference frequency-domain signal; and determine a relation between the first frequency-domain signal and the second frequency-domain signal based on the results of the first cross-correlation and the second cross-correlation.

22. The signal evaluator according to claim 20, wherein the instructions to obtain a reference frequency-domain signal comprise instructions that, when executed by the processor, cause the signal evaluator to obtain a time-domain reference signal and converting the time-domain reference signal to the frequency-domain reference signal.

23. The signal evaluator according to claim 22, wherein the time- domain reference signal is a sounding reference signal, SRS.

24. The signal evaluator according to claim 22, wherein the time- domain reference signal is a demodulation reference signal, DMRS.

25. The signal evaluator according to claim 20, wherein the reference frequency-domain signal is based on a signal that was transmitted by an antenna associated with the signal evaluator.

26. The signal evaluator according to claim 25, wherein the reference frequency domain signal is a regular downlink signal, or a signal specially configured for sensing purposes.

* * * * *